Feb. 26, 1935.   C. ELLIS   1,992,691
PROCESS OF OXIDIZING CRACKED PETROLEUM
Filed Feb. 21, 1922
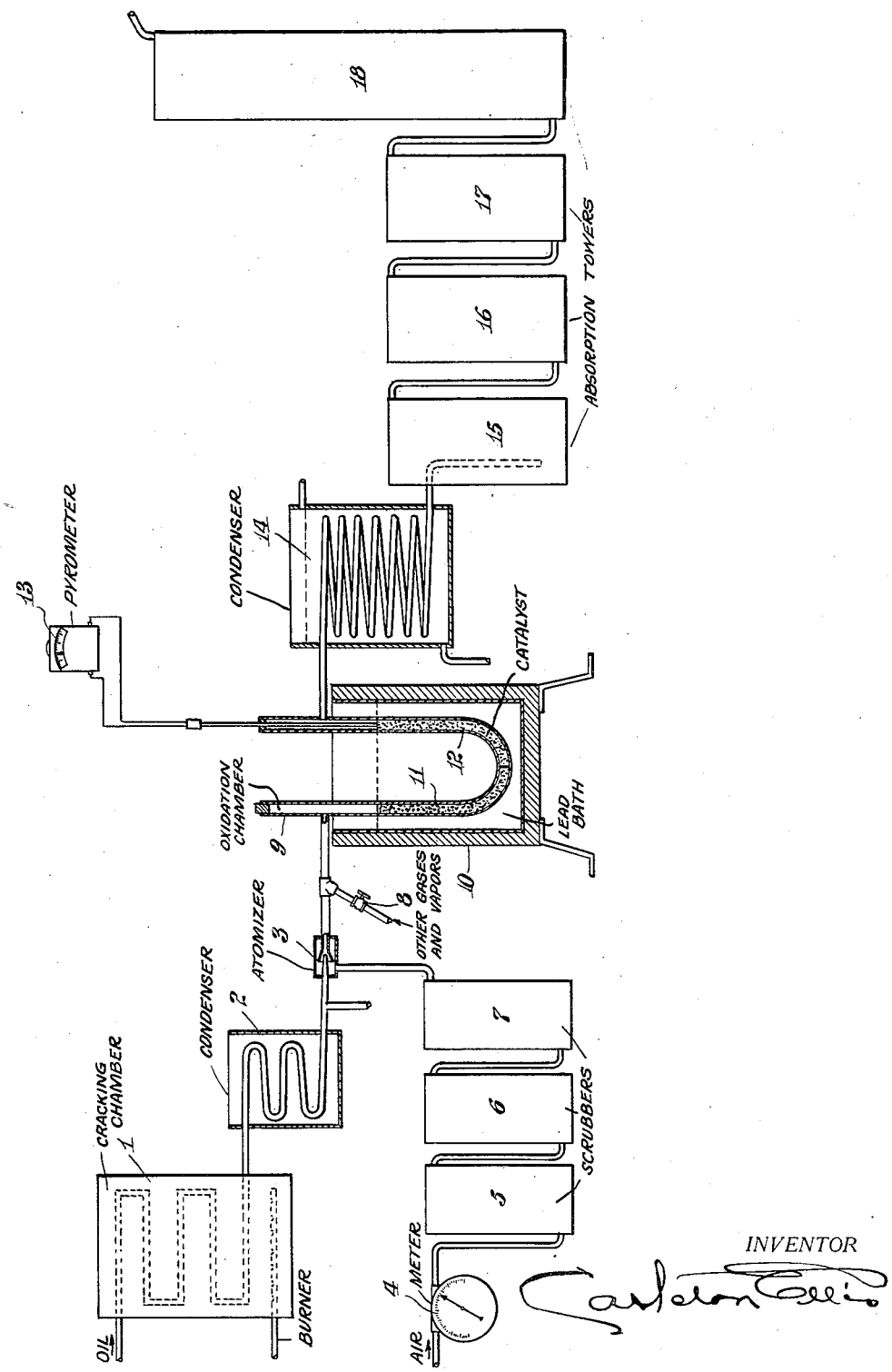
INVENTOR Patented Feb. 26, 1935

1,992,691

UNITED STATES PATENT OFFICE 1,992,691

PROCESS OF OXIDIZING CRACKED PETROLEUM

Carleton Ellis, Montclair, N. J., assignor to Ellis-Foster Company, a corporation of New Jersey Application February 21, 1922, Serial No. 538,338

27 Claims. (Cl. 260—123)

This invention relates to a process of treating petroleum products and relates especially to the oxidation of petroleum material by treatment with an oxygen-containing gas under suitable conditions of temperature to form desirable products of oxidation including dyestuff intermediates of the aromatic series, dyestuffs from kerosene and other petroleum oils; and has for its object to expand the products of a petroleum refinery far beyond the limitations imposed by present conditions of operation.

Preferably the material which I employ is that obtained from petroleum by a cracking step. Thus a heavy petroleum oil may be heated in a cracking still or passed through a heating zone in order to convert a portion of the material into lighter bodies. The products may be cooled in order to separate the heavier portions and the lighter portions including the gases from the cracking operation are mixed with air or oxygen and pass into a heating chamber preferably containing a catalytic body. Reaction takes place in the catalytic mass producing various substances containing oxygen such as organic acids, aldehydes and the like.

As a rather violent reaction may take place on contact between the hydrocarbon substances and air at the moment of contact with the catalytic material preferably the mixture entering the catalytic chamber is cooled so as to avoid such violent reaction. Without such pre-cooling the formation of carbon in the first layers of the catalyzer may progress to such an extent that in a short time the tube will be clogged with carbon.

The temperature used is preferably below a low red heat, that is below about 500° C. However the temperature should be high enough to bring about rapid conversion to intermediate products of oxidation. The reaction zone therefore, whether containing catalyzer or without it, should be heated to the effective temperature of formation of such intermediates. Temperatures above 200 or 250° C. are desirable for rapidity of oxidation.

Another feature of the invention consists in passing the mixture through the reaction zone at such a rate that not all oxygen is completely consumed, the effect being as if a slight excess of air were employed. Thus carbon as formed will tend to burn away and will not clog the catalytic mass to the same extent.

The accompanying drawing shows in diagrammatic form a type of apparatus which may be employed to carry out the present process. A portion of the drawing is shown in vertical section and a portion in longitudinal elevation.

In the drawing 1 is a cracking chamber here depicted as a tube or coil heated in the lower part by means of a gas burner. The products from cracking pass into a condenser tube of the condenser 2 and heavy material is drawn off through the outlet pipe just beyond the condenser. 3 is an atomizing device or Venturi tube arranged to bring about a mixture between the cracked products and air or an oxygen-containing gas. The latter is fed by a suitable pump (not shown) through the meter 4 and through the scrubbers 5, 6 and 7. One of these for example No. 7 may be used as a humidifier to give to the gas a definite content of moisture if desired. Thus if air is used and it is allowed to bubble through water under definite temperature conditions it will become saturated with water vapor to the same extent at all times and there will not be fluctuations in moisture content such as would occur through taking air directly from the atmosphere without first adjusting the degree of humidity.

The mixture of atomized light hydrocarbon products and air in a cooled condition passes into the catalytic chamber 9. The latter may be filled with suitable catalytic material as for example in the leg 11 pumice may be employed to carry out the initial stages of oxidation and in the leg 12 pumice coated with vanadium oxide may be employed to finish the oxidation. The catalyzing tube is placed in the lead bath 10. A pyrometer 13 indicates the temperature. 14 is a condensing coil. 15, 16, 17 and 18 are absorption towers.

The pipe 8 may be used for the introduction of other gases, vapors etc. as may be desired.

While the apparatus is not shown with valves suitable for maintaining the entire apparatus under pressure it is understood that the connections or terminals may be suitably supplied with valves so that pressure above atmospheric may be maintained in the apparatus if desired.

The cooling and condensation which takes place in the condenser 2 gives rise to a liquid portion and to a mist-like current of material which passes into the mixing chamber 3 to be thoroughly intermingled with oxygen or an oxygen-containing gas such as air. In the remainder of the transit into the catalytic chamber care should be observed not to permit the mixture to become heated as the reaction on contact with the catalyzer may thereby be too severe and excessive amounts of carbon be produced. To accomplish that object the pipe leading from the mixing chamber 3 into the catalyzer chamber may be lagged to prevent preheating through radiation of the heat from the chamber 10 or the pipe may be surrounded with a cooling jacket. Such heat insulating or cooling means are not shown herein being readily capable of application without further description or specific illustration.

In experiments which I have conducted there is always a considerable degree of activity at the point where the mixture comes in contact with the heated catalytic mass and beside the pre-cooling referred to it is also desirable to have the catalytic material of a weaker character in the first portion of the path of travel than it is in the subsequent portion. Also it is desirable in some cases to have the catalyzer of good heat conducting properties and for this reason fragments of metal such as iron may be used alone or interspersed with pumice. This will serve to dissipate the heat suddenly generated within the catalytic mass.

The composition entering the chamber 9 is preferably cooled to the point at which it is not a vapor but rather a mixture of fixed gases and condensed material forming a cloud or mist. This fine cloud or mist when incorporated with air does not oxidize so rapidly as when largely or entirely in the vapor state so that it may progress well into the catalytic mass before oxidation goes on to the desired degree throughout the material. Thus a further distribution or dissemination of heat is secured which is desirable.

As an example of one manner according to which the foregoing process may be carried out kerosene was allowed to drip at a regular rate of flow into the cracking furnace which was maintained at a cracking temperature preferably between 500 and 600° C. The cracked vapor was passed through an air-cooled condenser and the higher boiling oils condensed and collected in a suitable receiver. (Not shown in the drawing.) The cracked vapors were passed into the Venturi tube where they were mixed with the air supply. The air supply was obtained by means of a positive pressure blower and was first passed through gas meter then through a gas scrubbing tower containing copper sulphate to remove sulphur compounds, and into a gas scrubbing tower containing sulphuric acid in order to remove any moisture present in the air. Finally the dried air was passed into a humidifying tower containing water in order that the air should have a definite water content throughout the remainder of operation. The air was then passed on into the mixing chamber or Venturi tube where it was thoroughly mixed with the cracked oil vapors. If not sufficiently cooled the mixture of cracked oil and air may be passed through a water cooled condenser or other cooling device and on into the oxidizing chamber. The cloud entering the oxidizing chamber was approximately at room temperature. At the point where the gases enter the U-tube a somewhat violent reaction may take place as shown by the deposition of carbonaceous material at this point. If the entering gases possess a high temperature this undesirable reaction is favored. With hot entering gases the deposition of carbon may be such that at the end of between 4 and 5 hours it is necessary to open the tube and remove this carbon deposit. The cool mixture of air and oil mist was passed through the leg of the tube containing pumice and then through the leg containing pumice which had been coated with the oxide of vanadium. (The oxide of vanadium coated pumice was prepared by impregnating suitable sized pumice granules, namely between 5 and 10 mesh with a solution of ammonium meta vanadate containing 10% of vanadium by weight of the pumice. The entire mass was taken to dryness and heated at a temperature of 325–350° C. in the catalytic chamber while air was passed through the mass until the ammonium salt was completely converted.)

With the lead bath at a temperature of 425–450° C. the temperature of the exit gases at a point just above the catalytic mass was 320–360° C. The gas stream containing the oxidized petroleum was passed through a condenser 14 where a considerable portion of the condensable material was condensed and the condensate collected in receiving vessel 15. The stream containing considerable material in the form of a cloud or mist was scrubbed by passing through a gas scrubbing tower 16 containing oil where the bulk of the oil-soluble material was removed. Finally the stream was passed through water scrubbing tower 17 which removed a considerable quantity of water-soluble material from the gas and the residue of the mist was recovered by passing through a tower containing silica jel 18.

The receiver 15 in which the condensed vapors were collected contained a condensate which separated into two layers, a water-soluble layer and an oily layer, both of which has a distinctly acid reaction. The volume of the aqueous solution in the condensing tower was four times that removed from the gas humidifying tower. The oil condensed and scrubbed from the gas stream by tower 15 was about twelve and a half per cent of the original quantity of oil passed into the cracking chamber. The oil condensed between the Venturi tube and cracking furnace was about 20 per cent of kerosene passed into the furnace. The ratio of air to kerosene passed through the apparatus was 34 cubic feet per liter of kerosene.

Among the products obtained by the oxidation of kerosene was a white crystalline material of acid reaction having when purified a melting point of 128° C. The crystals were soluble in dilute alcohol and in alcohol and ether. They sublimed without decomposition. From these properties, the neutralization equivalent and other tests the material appeared to be phthalic anhydride.

This was confirmed by fusion with phenol and a small amount of sulphuric acid at a temperature of 160° C. as phenolphthalein was thereby formed. The same procedure employing resorcin in place of phenol produced fluorescein. The latter, precipitated from alkaline solution by acetic acid and re-dissolved in glacial acetic acid, was treated with bromine and yielded eosin.

By the present process therefore the means are afforded of starting with a petroleum hydrocarbon such as kerosene and by cracking and oxidation obtaining an oxygen-containing compound of the aromatic series in a very simple manner. Hence from petroleum by the present process I may make not only the intermediate aromatic products of oxidation but dyes as for example eosin.

It has heretofore been proposed to make dyes from acid sludge formed in refining petroleum but so far as I know no procedure has been offered for converting a petroleum oil into a dyestuff intermediate such as phthalic anhydride.

From the phthalic anhydride phthalic acid may be made and also various compounds from the latter. Besides the ability to produce aromatic acids the process enables the production of aromatic aldehydes and aromatic aldehyde acids. Thus benzaldehyde and higher or more complex aldehydes of the aromatic series may be obtained by the present process.

This detailed description should not be taken as expressing limitations of procedure and apparatus but it is offered as an illustrative case.

While cracked petroleum is preferred herein owing to its reactive properties I do not limit myself thereto but may form a cloud or mist from uncracked petroleum products as by condensation, mingle this with air or oxygen and, preferably without a diluent, preferably cool, pass into a reaction zone or contact mass where the cool mixture is suddenly brought to the reaction temperature (preferably below a low red heat) in the presence of contact material thus directing the oxidation to the production of useful intermediate compounds instead of carbon, water and oxides of carbon.

Kerosene has been mentioned herein in an illustrative way but it should be understood that other light or heavy petroleum oils, residues and the like may be employed for the production of aromatic products of cracking and oxidation. Throughout the present description I have referred principally to the use of a reactive temperature below a low red heat, namely about 500° C. The actual temperature of visible red is regarded as about 485° C. and in some cases I may increase the temperature of the catalyst chamber to a low red heat or slightly above a low red in order to obtain a better yield of oxygen-containing aromatic compounds. Thus the oxidation may take place at the same temperature as the cracking operation and may be almost a part of it in that oxygen is injected into the tubes or receptacle used for cracking in such a way that the oxygen contacts with oil which has already been cracked and is in a suitably reactive condition for oxidation. A simple means for carrying out such a process would be a tube into one end of which oil is admitted and is raised to a cracking heat then passes mixed with air through a mass of catalyzer in the same tube but placed at the other end thereof. While such procedure is not particularly recommended and has the objection that the products of reaction are strongly heated and therefore are in a less easily controlled state for the production of intermediate oxidation products this modification is noted as a possible variation.

The vanadium catalyst used above is capable of replacement by other catalytic material as for example a mass of iron or pumice coated with iron oxide. As stated in my application Serial No. 284,372, catalytic material such as copper gauze, brass and the like may be used. Such a metallic catalyzer has the advantage of serving as a good heat conductor so that local heating in the catalytic mass is minimized. Pieces of wire gauze or fragments of the metal may be used as desired. Compounds such as copper or chromium oxide, iron vanadate, silver chromate and the like may be used.

As stated in the patent applications aforesaid when oxidizing material rich in olefins it is important to control the temperature within narrow limits and a pyrometer may be placed in the catalytic mass to regulate the temperature and a thermostatic device may be employed to regulate the temperature in an automatic manner. This may be done for example by admitting steam or water vapor, preferably the latter, or water itself into the catalytic zone by such thermostatic control. Or other cooling means may be applied as for example increase in the rate of flow of the cool incoming mixture, introduction of a cooling medium into a cooling coil contained in the catalytic mass &c.

Oils containing much sulphur are preferably purified prior to treatment in this manner.

The temperature employed in cracking the oil may be increased substantially above that set forth herein and the cracking may take place at such increased temperature under higher pressure if desired.

The treatment of cracked material in the form of a mist entering the mixture to be oxidized at a low temperature appears to favor the production of oxidized aromatic compounds such as phthalic anhydride.

The sudden transition from a low or room temperature to the temperature of reaction tends to minimize explosions and undesirable side reactions and permits of a favorable yield of aromatic products of oxidation.

In the process as preferably operated an insufficient amount of oxygen is used and hence a substantial proportion of the hydrocarbons produced by cracking or originally present in the oil may pass through the heating zone in an unburnt or unoxidized condition. These are collected by condensation and a mixture of light hydrocarbons is obtained on rectification which is useful as a gasoline substitute. It is my purpose to separate from such hydrocarbons as much of the oxygen-containing material as may be useful in other ways but any oxidized material not of value otherwise but which is useful in a volatile fuel may be left with the hydrocarbons. Any acid such as phthalic acid present may be extracted readily from the hydrocarbons by treatment with caustic soda solution. The process serves therefore to provide both gasoline or a gasoline substitute with or without certain partially oxidized bodies and also provides products of intermediate combustion or oxidation of value for purposes other than as a fuel. It appears that there are three classes of hydrocarbons present in the cracked material. There are the very sensitive hydrocarbons which are so unstable they may be immediately burnt to oxides of carbon and water. There are more stable hydrocarbons which are partially oxidized to the intermediate products of oxidation such as organic acids and a third group of hydrocarbons which can go through a considerable mass of contact material without being attacked by the oxygen. Thus a selective combustion or oxidation enables considerable variation in the products to be obtained through modification of operating conditions.

To recapitulate the process relates to the oxidation of petroleum particularly cracked petroleum by means of passage of the cracked material in contact with oxygen or with oxygen and a diluent such as steam or with air into a heated reaction zone maintained at a reactive temperature below a low red heat; the cracked material or products of destructive distillation of the petroleum oil being preferably introduced into the reaction zone in the form of a mist rather than as a vapor and being therefore preferably chilled prior to introduction into such zone. In said reaction zone there is preferably situated a catalytic mass preferably of mild catalytic action where the mist first comes in contact and in subsequent portions of the path of travel preferably having a greater catalytic action with respect to oxidation. The cracking may take place at atmospheric pressure or at sub-atmospheric pressure or at superatmospheric pressure. By condensing the cracked material in part and subsequently admixing with the air or other oxidizing gas the petroleum material is very largely converted into a mist. The formation of this mist is facilitated by cooling and the present invention is in part concerned with the use of a cool mixture or precooled mixture of oil in vapor form but preferably in non-vaporous form appearing as a fog or mist suspended in the cool oxidizing gases. Contact of such cool mixture with the heated catalyzer precludes too violent an initial reaction and thereby assists in the gradual consumption of the oxygen so that the oxidation is not an abrupt and violent one to carbon dioxide with deposition of great masses of carbon but rather is a slower oxidizing conversion. Maintenance of the temperature below a low red heat, that is below about 500° C., coupled with the employment of a precooled mixture entering the catalytic zone permits of the desired gradual oxidation affording various products of value. The condensates of a hydrocarbon nature may be employed as fuels and the products of oxidation in the nature of acids or other oxygenated compounds having greater value in the arts, than value as fuels, may be used to advantage in other fields.

Finally I may add that my process enables the direct conversion by what may be regarded essentially as two simple heat treatments of petroleum oil into aromatic products of oxidation and thus by these two heating operations I may cheaply produce from petroleum oils, valuable dyestuff intermediates, medicinal chemicals and various products known as fine chemicals commanding vastly higher prices than the crude oil from which they are obtained.

This application contains matter continued from my copending application Serial No. 284,375, now Patent No. 1,697,267, patented January 1, 1929.

What I claim is:—

1. In the process of oxidizing petroleum the steps which consist in introducing a substantially non-vaporous fog of cracked petroleum suspended in an oxygen-containing cool current of fixed gases into a reaction zone maintained at a reactive temperature below a low red heat.

2. In the process of oxidizing petroleum the steps which consist in introducing a mist of cracked petroleum suspended in an oxygen-containing cool current of fixed gases into a catalytic reaction zone maintained at a reactive temperature below a low red heat.

3. The process which comprises destructively distilling petroleum oil and subjecting the products of destructive distillation admixed with air in a cool condition to the action of a heated catalyzer maintained at a reactive temperature below a low red heat.

4. In the process of treating petroleum the steps which comprise subjecting heavy petroleum to a cracking temperature, separating light and heavy products, admixing the light products with oxygen and a diluent and passing the mixture in a cool condition into a reaction zone heated to a reaction temperature but below a low red heat whereby useful products of intermediate oxidation are obtained.

5. In the process of treating petroleum the steps which comprise subjecting heavy petroleum to a cracking temperature, admixing a portion at least of the cracked products with oxygen and water vapor and passing the mixture in a cool condition into a mass of contact material heated to a reaction temperature but below a low red heat whereby useful products of intermediate oxidation are formed.

6. The process of making phthalic anhydride which comprises passing kerosene through a cracking zone, admixing a portion of the cracked products with humidified air and passing the mixture at about room temperature into a mass of contact material heated to a reaction temperature but below a low red heat whereby phthalic anhydride is obtained.

7. In the process of making partial combustion products, the steps consisting of cracking a liquid hydrocarbon, mixing the cracked hydrocarbon in finely divided condition with air in measured amounts, and passing the same through a hot reaction zone at a temperature below a red heat.

8. In the process of making partial combustion products, the steps consisting of cracking a liquid hydrocarbon, mixing the cracked hydrocarbon in finely divided condition with air in measured amounts, and passing the mixture over a catalytic mass in a heated reaction zone at a temperature below red heat.

9. In the process of oxidizing petroleum, the step of oxidizing a stream of cracked hydrocarbon oil in finely divided condition in the presence of oxygen in a heated reaction zone different from that of the cracking zone.

10. In the process of producing oxidized products, the steps of cooling a stream of hot petroleum hydrocarbons and passing the cooled hydrocarbons over a catalytic mass in the presence of oxygen in a heated reaction zone to produce partial combustion products.

11. In the process of oxidizing petroleum, the step of oxidizing a stream of cracked hydrocarbon oil in finely divided condition in the presence of oxygen in a heated reaction zone under pressure greater than atmospheric.

12. In the process of producing oxidized products, the steps of cooling a stream of hot-vaporized petroleum hydrocarbons and passing the cooled hydrocarbons over a catalytic mass in the presence of oxygen in a heated reaction zone under pressure greater than atmospheric to produce partial combustion products.

13. In the process of making partial combustion products, the steps consisting of cracking a liquid hydrocarbon, mixing the cracked hydrocarbon in finely divided condition with air in measured amounts, and passing the same through a hot reaction zone at a temperature below a red heat under pressure greater than atmospheric.

14. In the process of making partial combustion products, the steps consisting of cracking a liquid hydrocarbon, preparing a stream of the cracked hydrocarbon in finely divided condition, mixing the stream of cracked hydrocarbon in finely divided condition with air in measured amounts, cooling the mixture, and passing the cooled mixture through a hot reaction zone at a temperature below a red heat.

15. In the process of oxidizing petroleum, the step of oxidizing a stream of cracked hydrocarbon oil in mist condition in the presence of oxygen in a heated reaction zone.

16. In the process of producing oxidized products, the steps of cooling a stream of hot-vaporized petroleum hydrocarbons to form a mist of such products and passing the cooled mist over a catalytic mass in the presence of oxygen in a heated reaction zone to produce partial combustion products.

17. A process as set forth in claim 15 carried out under pressure greater than atmospheric.

18. A process as set forth in claim 16 in which the treatment in the heated reaction zone is carried out under a pressure greater than atmospheric.

19. In the process of treating petroleum the steps which comprise subjecting heavy petroleum to a cracking temperature, separating light and heavy products, admixing the light products with oxygen and a diluent, cooling the mixture, and passing the mixture in a cool condition into a reaction zone heated to a reaction temperature but below a low red heat, whereby useful products of intermediate oxidation are obtained.

20. In the process of treating petroleum, the steps which comprise subjecting heavy petroleum to a cracking temperature, admixing a portion at least of the cracked products with oxygen and water vapor, cooling the mixture, and passing the cool mixture into a mass of contact material heated to a reaction temperature but below a low red heat, whereby useful products of intermediate oxidation are formed.

21. In the process of making partial combustion products, the steps consisting of cracking a liquid hydrocarbon, and oxidizing the cracked hydrocarbon in finely divided condition with oxygen in measured amounts in a hot reaction zone at a temperature below a red heat.

22. In the process of making partial combustion products, the steps of subjecting hydrocarbon material in finely divided condition to non-catalytic oxidizing conditions in the presence of oxygen in a hot reaction zone, and subjecting the reaction products to further oxidizing conditions in the presence of oxygen in a hot reaction zone and in the presence of a catalyst.

23. In the process of making partial combustion products, the steps of subjecting hydrocarbon material to conditions of non-catalytic partial oxidation, and subjecting the treated material to further conditions of catalytic partial oxidation.

24. In the process of making partial combustion products by oxidation of hydrocarbon material under pressures greater than atmospheric, the steps of subjecting hydrocarbon materials to conditions of non-catalytic partial oxidation and subjecting the treated materials to further conditions of catalytic partial oxidation.

25. In the process of oxidizing petroleum the steps which consist in introducing a substantially non-vaporous fog of distilled petroleum suspended in an oxygen-containing cool current of fixed gases into a reaction zone maintained at a reactive temperature below a low red heat.

26. In the process of making partial combustion products, the steps consisting of treating a liquid hydrocarbon to produce a mixture of saturated and unsaturated hydrocarbons therefrom, mixing the treated hydrocarbon in finally divided condition with air in measured amounts, and passing the same through a hot reaction zone at a temperature below a red heat.

27. In the process of making partial combustion products, the steps consisting in mixing hydrocarbons selected from the group consisting of cracked and uncracked petroleum hydrocarbons, in finally divided condition with air in measured amounts, and passing the same through a hot reaction zone under pressure above atmospheric.

CARLETON ELLIS.